UNITED STATES PATENT OFFICE.

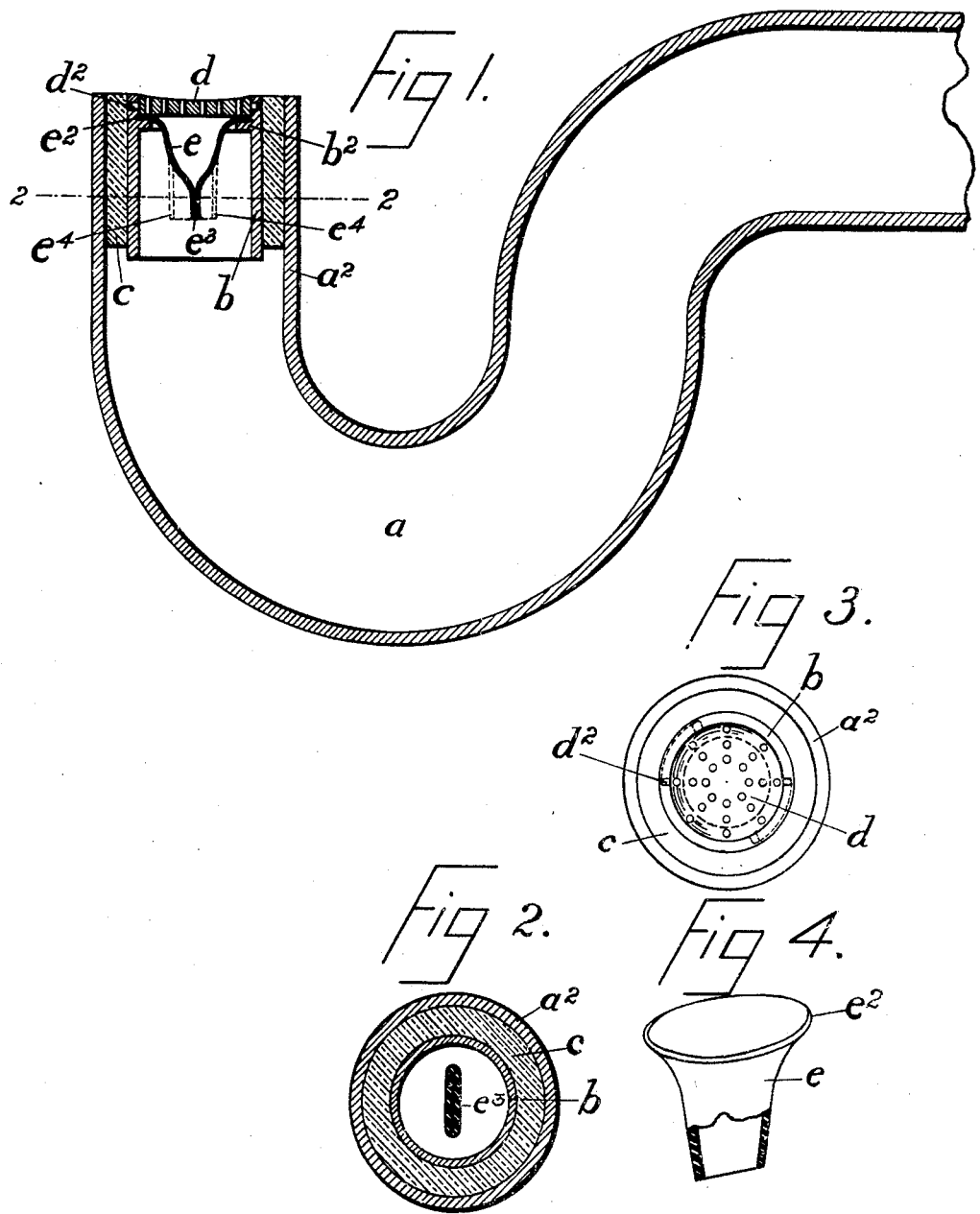

WILLIAM R. BONNELL, OF ELIZABETH, NEW JERSEY, ASSIGNOR OF ONE-HALF TO GEORGE H. SCHLOTTERER, OF ELIZABETH, NEW JERSEY.

SEAL-TRAP FOR DRAIN-PIPES.

No. 803,979.      Specification of Letters Patent.      Patented Nov. 7, 1905.

Application filed January 10, 1905. Serial No. 240,471.

*To all whom it may concern:*

Be it known that I, WILLIAM R. BONNELL, a citizen of the United States, residing at Elizabeth, in the county of Union and State of New Jersey, have invented certain new and useful Improvements in Seal-Traps for Drain-Pipes, of which the following is a specification, such as will enable those skilled in the art to which it appertains to make and use the same.

This invention relates to seal-traps for the drain-pipes of sinks, water-basins, and the like, and the object thereof is to provide an improved device of this class which is simple in construction and operation and which will prevent the backflow of noxious odors, gases, and water from such pipes and the mains with which they are connected; and with this and other objects in view the invention consists of a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a sectional side view of an ordinary trap and drain-pipe provided with my improvement; Fig. 2, a section on the line 2 2 of Fig. 1; Fig. 3, a plan view of the upright portion of the trap and drain-pipe shown in Fig. 1; Fig. 4, a perspective side view of the trap device proper and showing the same partially in section.

In the drawings forming part of this specition I have shown at $a$ an ordinary trap and drain-pipe, such as is usually employed in connection with kitchen or cellar sinks, and in the practice of my invention I secure in the upright portion $a^2$ thereof a hollow casing $b$, which is preferably tubular in form, and this connection is preferably made by means of a tubular bushing or packing $c$, which may be composed of any suitable material and which may be secured in the upright part $a^2$ of the trap and drain-pipe $a$ in any desired manner.

In the upper end portion of the casing $b$ and at a predetermined distance below the top thereof is an annular inwardly-directed flange or rim $b^2$, and the upper end of the casing $b$ is closed by a perforated plate $d$, which is connected with said casing by means of a bayonet-joint, as shown at $d^2$, the said plate $d$ being provided at its opposite side with lugs or projections which enter angular grooves in the casing $b$.

Within the top portion of the casing $b$ and secured therein by the plate $d$ is placed a hollow seal-trap device $e$, which is circular in form in cross-section and the top of which is flared outwardly and provided with an annular flange or rim $e^2$ and the opposite sides of which are contracted toward the lower end, so that in the normal position thereof they are closed together, as shown at $e^3$.

In practice the seal device $e$ is inserted into the upper end of the casing $b$, and the plate $d$ is then secured in place and presses on the flange or rim $e^2$ of the seal device $e$ and securely holds said seal device in position.

The seal device $e$ is composed of rubber, rubber and canvas, or any other suitable flexible material which possesses elastic qualities and is impervious to water and other liquids.

In the operation of this device the water from the sink flows through the plate $d$ in the usual manner and into the seal device $e$ and down through the lower end thereof, the sides of the lower end portion thereof opening into the position shown in dotted lines at $e^4$, and when the flow of water or other liquids ceases the lower end of the seal device $e$ automatically closes, and thus prevents the escape of noxious gases or odors from the pipe $a$.

Having fully described my invention, what I claim as new, and desire to secure by Letters Patent, is—

1. A drain-pipe provided with a trap device, comprising a casing which is secured therein and provided with an inwardly-directed annular flange, and a hollow flexible and elastic seal having a top rim which rests on said flange and the side portions of which are contracted at the lower end thereof so as to close said end, and a perforated plate secured in the top of said casing and serving to close the same and to hold the rim of said seal on the flange in said casing, substantially as shown and described.

2. A trap or seal for drain-pipes, comprising a casing secured in said pipe and provided with an inwardly-directed annular flange, a hollow flexible and elastic seal having a top rim which rests on said flange and the side portions of which are contracted at the lower end thereof so as to close said end, and a perforated plate detachably secured in the top of said casing and serving to close the same and to hold the rim of said seal on the flange in said casing, substantially as shown and described.

3. A seal for drain-pipes, comprising a casing secured in said pipe and provided below the top thereof with an inwardly-directed annular flange, a hollow flexible and elastic seal having an annular top rim which rests on said flange and the lower end of which extends downwardly into said casing, the side portions thereof being also contracted at the lower end thereof so as to close said end, and a perforated plate detachably secured in the top of said casing and serving to close the same and the perimeter of which presses on the rim of the elastic seal so as to secure said seal in place, substantially as shown and described.

In testimony that I claim the foregoing as my invention I have signed my name in presence of the subscribing witnesses, this 9th day of January, 1905.

WILLIAM R. BONNELL.

Witnesses:
LOUIS J. RICHARDS,
GEORGE C. TENNEY.